United States Patent Office 3,004,779
Patented Oct. 17, 1961

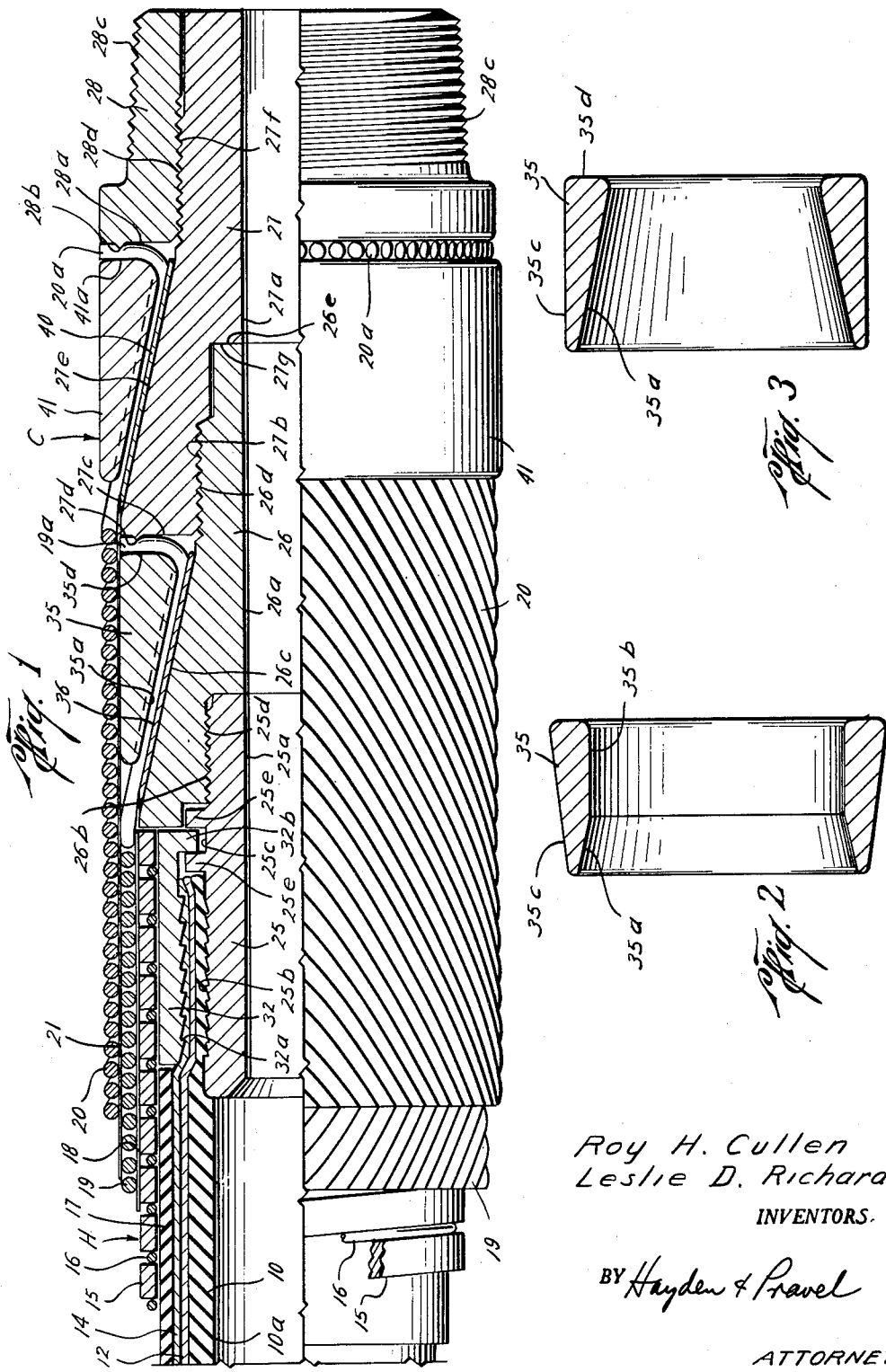

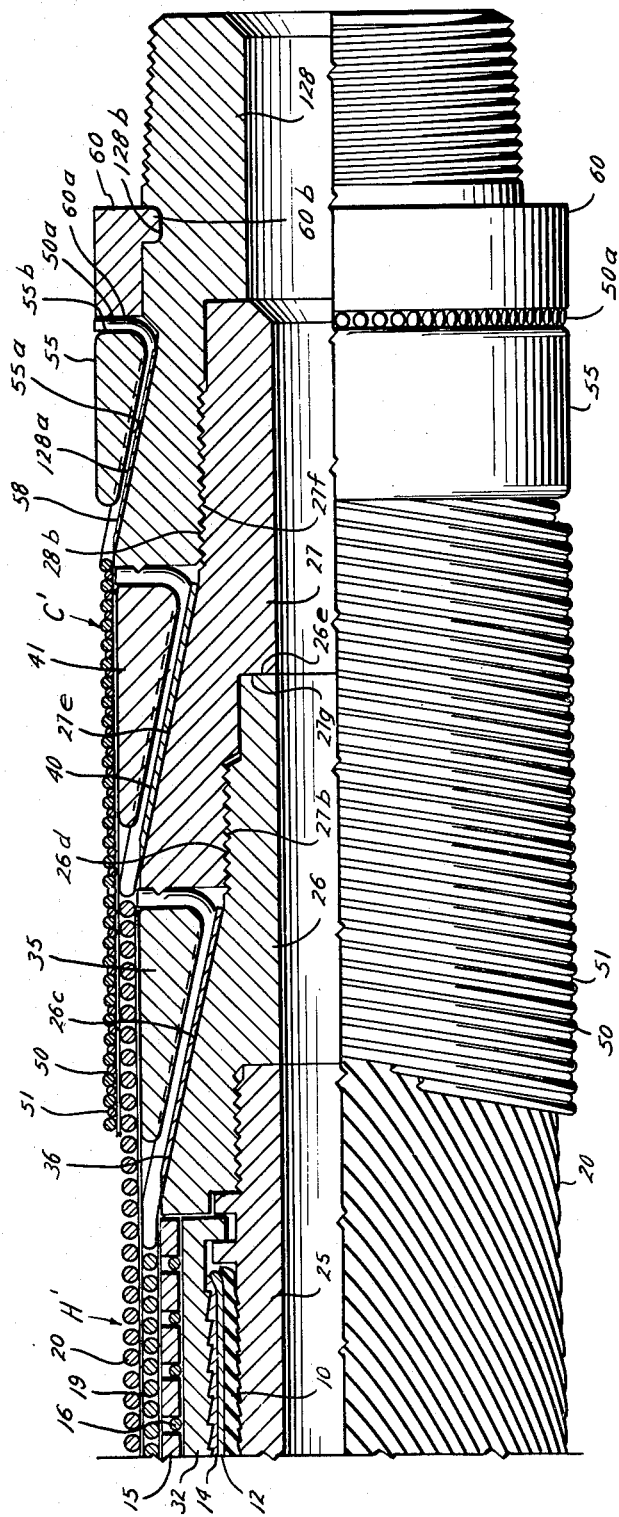

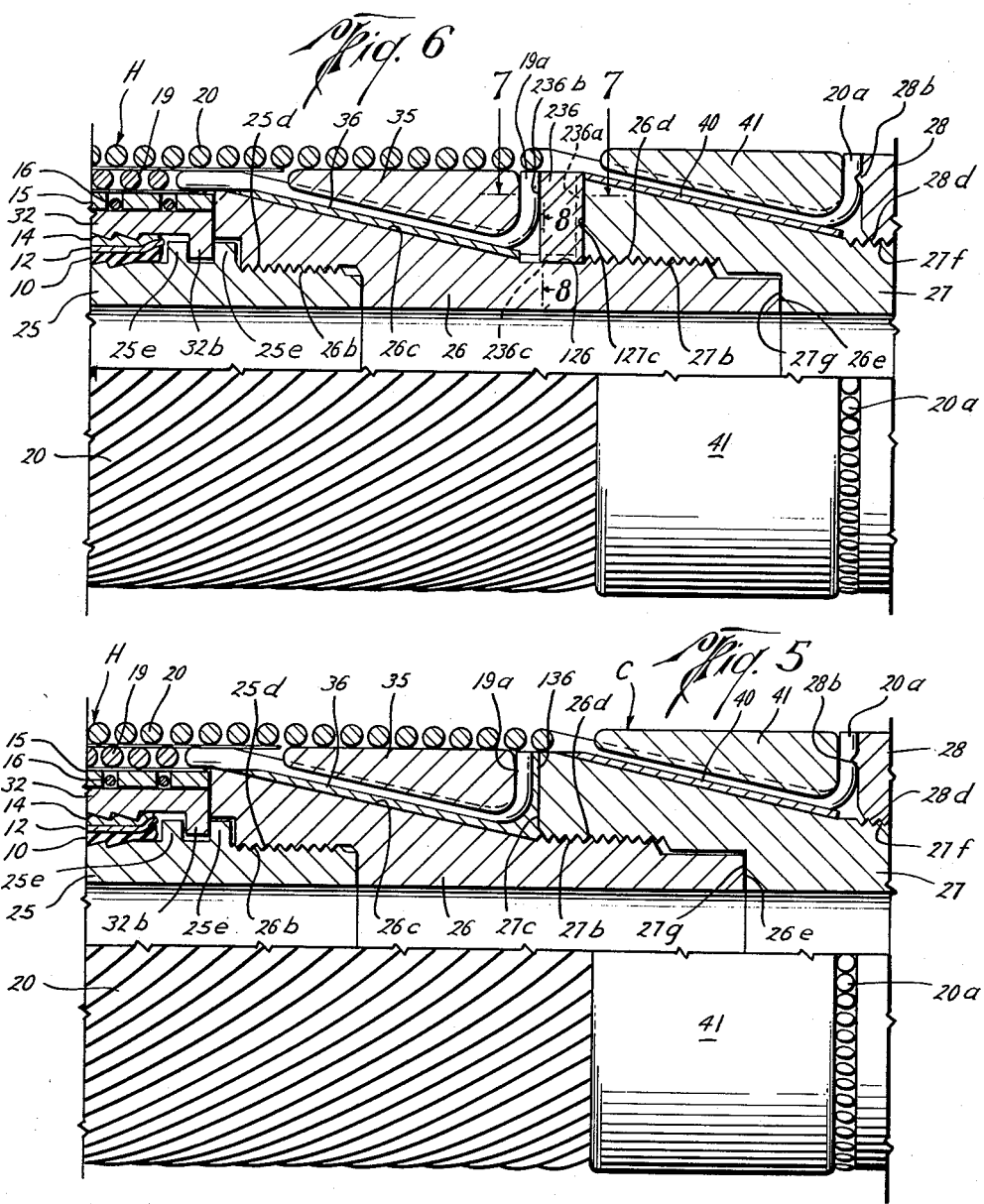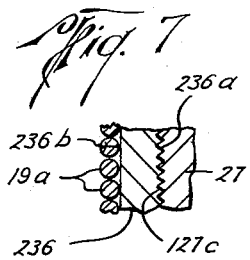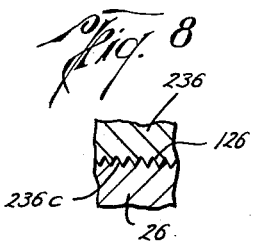

3,004,779
END COUPLING FOR HOSE HAVING PLURAL LAYER WIRE REINFORCING
Roy H. Cullen, 1701 1st City National Bank, and Leslie D. Richards, both of Houston, Tex.; said Richards assignor to said Cullen
Filed June 7, 1957, Ser. No. 664,230
11 Claims. (Cl. 285—149)

This invention relates to new and useful improvements in couplings for flexible supports or hoses and methods of attaching same.

This application is a continuation in part of United States patent application Serial No. 514,024, filed June 8, 1955 and now abandoned.

An important object of this invention is to provide a new and improved means for attaching a plurality of wires to a coupling which includes a tapered ring which is swaged around the wires for effecting such attachment, whereby a longitudinal pulling force on the wires is distributed evenly over the tapered inner surface of the ring.

Another object of this invention is to provide a new and improved means and method for attaching a plurality of wires to a coupling, wherein a relatively soft material such as zinc is disposed between the wires and the coupling with the wires embedded in the relatively soft material to prevent a disconnection of the wires from the coupling when a torque or turning force is applied to the wires.

Another object of this invention is to provide a new and improved method of connecting a plurality of wires to a coupling which includes the positioning of a ring on the coupling around the wires to initially hold the wires on the coupling, and the swaging of the ring thereafter to compress same about the wires to prevent said wires from moving relative to the coupling.

Another object of this invention is to provide a new and improved method of connecting a plurality of wires to a coupling wherein a tapered ring is positioned on the wires and thereafter the ring is deformed to embed the wires in the inner surface of the tapered ring.

Another object of this invention is to provide a new and improved coupling for attaching a plurality of layers of wires on a hose together at the ends thereof, wherein the ends of each of the layers of wires is confined between a coupling body and a tapered ring without requiring an increased external diameter at the coupling as compared with the external diameter of the hose.

A further object of this invention is to provide a new and improved coupling for attaching a plurality of wires thereto, wherein the wires are laid helically and adjacent to each other, and wherein means are provided for preventing a relaxing or loosening of such wires when a torque is applied to the wires during the use thereof.

A still further object of this invention is to provide a new and improved coupling for a hose, wherein the hose includes at least one circumferentially disposed annular layer of helical wires which are clamped near their ends between a clamping ring and an annular coupling body, and wherein the wires are clamped at their ends between the annular substantially lateral edge of the clamping ring and a back-up element connected with the coupling body.

A particular object of this invention is to provide a coupling for a plurality of wires in an annular layer on a hose, wherein the layer of wires is adapted to be positioned and clamped between a clamping ring and a coupling body near the ends of such wires and between the lateral edge of the clamping ring and a back-up element at the ends of such wires, and wherein a metallic material or the like is coated on the coupling body and the back-up element prior to the swaging of the clamping ring into clamping position on the wires so that such metallic material is forced into the areas between the wires to embed same and to retain such wires against twisting or movement when torque or other forces are imparted to the wires.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

FIGURE 1 is a view, partly in elevation and partly in section, illustrating one form of the end coupling of this invention;

FIGURE 2 is a sectional view illustrating one of the coupling rings prior to the swaging thereof;

FIGURE 3 is a sectional view illustrating the same coupling ring of FIGURE 2 after such ring has been swaged or deformed to clamp the wires on the coupling;

FIGURE 4 is a view, partly in elevation, and partly in section, illustrating another form of the coupling illustrated in FIGURE 1;

FIGURE 5 is a view, partly in elevation and partly in section, illustrating a portion of the hose construction and coupling illustrated in FIGURE 1 of the drawings, but illustrating a modification thereof for additional resistance to torque; and FIGURE 6 is a view similar to FIGURE 5, except that it illustrates a further modification of the construction of FIGURE 1 with respect to the means for preventing separation of the coupling upon the application of a torque or other turning force to the wires connected with the coupling;

FIGURE 7 is a sectional view taken on line 7—7 of FIGURE 6; and

FIGURE 8 is a sectional view taken on line 8—8 of FIGURE 6.

In the drawings, the letter H designates generally a support or hose which is particularly suitable for supporting fluid-driven drill bits (not shown). At the end of each section of the flexible support or hose H, a coupling C is provided for connecting the lengths or sections of the support or hose H together to form a continuous support or hose which is adapted to be lowered into a well bore.

As illustrated in the drawings, the hose H includes an inner tube or fluid conductor 10 which is formed of rubber or any similar elastic resilient material and which serves as the main conduit through which the fluid flows during the use of the support or hose H. In order to provide for burst strength, the inner tube or flow conductor 10 is surrounded by a two-ply wire braid which includes the wire braid layers 12 and 14, which are of conventional construction. A coil spring 15 surrounds the wire braid layer 14 and such spring 15 is formed of metal and is wound in a right-hand direction, with filler cords 16 laid between the layers making up the coil 15. Although the coil 15 is preferably made up of a resilient substantially rigid metal, it can be formed of other materials so long as they are sufficient to prevent crushing or collapsing of the coil 15 when the hose H is curved or bent around a drum or other supporting surface.

The coil spring 15 is surrounded by a plurality of helically wound wires 19 which extend in a right-hand direction and which are provided primarily for end pull strength. Such wires 19 are wound at an angle of about 30° with respect to the vertical axis or longitudinal axis of the support or hose H. The second outer layer of wires 20 surrounds the first outer layer of wires 19 and such wires 20 extend at an angle of about 30 degrees with respect to the vertical or longitudinal axis of the hose H, but in a left-hand direction so that they extend in an opposite direction from the wires 19. The wires 20 provide for end pull strength, but they also provide for torque resistance.

A layer 17 which is formed of rubber or plastic is interposed between the coil 15 and the wire braid layer 14 to decerase the frictional resistance therebetween as the coil 15 functions to resist torque imparted to the hose H during use. Only the two outer layers of wires 19 and 20 are utilized in the hose H, but an outer covering of rubber of similar resilient material could be included if desired. The coupling C of FIGURE 1 includes a nipple 25, a body section 26, another body section or retaining member 27, and a male connector 28 which together constitute the body of the coupling C. The central bores or passages 25a, 26a, and 27a of the members 25, 26, and 27, respectively, are in communication with the bore of interior 10a of the inner tube or fluid conductor 10.

The inner conductor 10 and the wire braid layers 12 and 14 are clamped on the nipple 25 by a clamping ring 32 which has buttress teeth 32a formed on the inner surface thereof for engagement with the outer layer 14 wire braid. The nipple 25 has similar buttress teeth 25b formed on its external surface and which engage the inner surface at the end of the fluid conductor 10 so as to confine the ends of the conductor 10 and the wire braid layers 12 and 14 between the buttress teeth 25b and 32a. An inwardly extending annular flange 32b on the clamping ring 32 fits into a circumferential groove 25c formed on the external surface of the nipple 25 to thereby retain the ring 32 against the longitudinal movement relative to the nipple 25. The ring 32 can, of course, be of any conventional type which is apt to be compressed for applying a clamping action to the layers 10, 12 and 14, but preferably the ring 32 is a solid ring which is formed of metal or other material which retains itself in a compressed condition. The ring 32 would be applied in its clamped position prior to the addition of the layers 15, 16, 19 and 20 and ordinarily would be swaged into the compressed clamping position.

The nipple 25 is also formed with threads 25d on its external surface which are in threaded engagement with internal threads 26b formed on the inner enlarged diameter bore portion of the body section 26. The external surface of the body member 26 is tapered at 26c downwardly and inwardly with respect to the vertical or longitudinal axis of the hose H and the coupling C.

A coupling ring or compression ring 35 surrounds the coupling body section 26 and retains the ends of the plurality of wires 19 in a connected or attached position on the coupling body section 26. As will be explained more in detail hereinafter, the coupling ring 35 is initially formed with an inner inclined or tapered surface 35a (FIGURE 2) which is parallel to, or substantially parallel to, the inclined or tapered surface 26c so that the ring 35 is adapted to be initially positioned on the body section 26 with the ends of the wires 19 between the surfaces 26c and 35a to thereby initially hold the wires 19 in position for effecting the final connection to the coupling. The bore 35b (FIGURE 2) of the ring 35 is substantially parallel to the longitudinal axis of the coupling C and the hose H and, initially, such bore portion 35b does not apply any gripping or compressive force to the ends of the wires 19. The outer surface 35c of the coupling ring 35 is tapered upwardly and outwardly initially, all as indicated in FIGURE 2 of the drawings. After the coupling ring 35 is positioned on the body section 26, a radial inward compressive force is applied to the ring 35 by the usual type of swaging apparatus to thereby compress the ring 35 to deform same into the shape illustrated in FIGURES 1 and 3. Such swaging of the ring 35 forces the outer surface 35c downwardly so that it becomes substantially parallel to the longitudinal axis of the coupling C and the hose H, and it effects a deforming of the bore portion 35b downwardly so that it thereafter is in effect a continuation of the inclined or tapered bore portion 35a. During such swaging action, the inner surface of the compression or coupling ring 35 is embedded into the wires 19, or, stated differently, the wires 19 are embedded into the inner surface 35a of the coupling ring 35.

It should also be pointed out that a layer of material such as zinc 36 is provided on the inclined or tapered surface 26c (FIGURE 1), in the usual case, so as to embed the wires 19 therein during the swaging of the ring 35 into its connected or attached position (FIGURE 1). It will be appreciated that the ring 35 must be formed of a material which is somewhat softer than the wires 19 and likewise the relatively soft material 36 must also be somewhat softer than the wires 19 in order to obtain the embedding of the wires 19 into such materials. However, in order to provide a firm backing during the swaging of the ring 35 on the body section 26, such section 26 is formed of a relatively hard material which does not deform or change during the swaging operation. Although zinc is the preferred material for the layer of material 36, it will of course be understood that other equivalent materials can be utilized. The zinc is applied in a molten state on the surface 26c and after the zinc hardens, it is preferably machined to form a smooth external surface upon which the wires 19 are positioned. Upon the swaging of the clamping or coupling ring 35, as will be more fully explained hereinafter, the wires 19 are embedded in the zinc 36 so that the zinc actually penetrates into the small longitudinal open areas between the wires 19. The zinc thus provides a very hard metallic base in which the wires 19 are embedded so as to resist turning of such wires relative to the coupling body 26. It will thus be appreciated that any material which can be applied in a soft condition to the coupling body 26 and which is subsequently hardened at normal temperatures could function in place of the zinc, but of course, such material cannot be a material which is subject to shearing or embrittlement since materials of that type would crack and shear if any appreciable load or torque is imparted to the wires 19. It should be pointed out that the wires 20 would not be in place over the body section 26 during the swaging of the ring 35 into position.

After the ring 35 has been positioned on the body section 26 but prior to the swaging thereof, the body section 27 is added to the section 26 by threading same so as to engage the threads 26d with the internal threads 27b. Such threads 26d and 27b are left-hand threads ordinarily so as to prevent unthreading thereof when the hose is under tension. Thus, with the wires 19 wrapped in a left-hand or counterclockwise direction (as viewed from the left end of FIGURE 1), and with the wires 20 wrapped in a right-hand or clockwise direction (as viewed from the left end of FIGURE 1), a tension or axial force acting on the hose H tends to straighten the wires 19 and 20 and it imparts opposite turning forces to the wires 19 and 20 as they tend to become straightened. Since the wires 19 are positioned on the coupling body 26 and the wires 20 are positioned on the coupling body 27, the opposite turning effect of the wires 19 and 20 causes the coupling bodies 26 and 27 to move relative to each other. With the threads 26d and 27b formed as left-hand threads, such opposite rotational movement of the bodies 26 and 27 tends to tighten the threads 26d and 27b to maintain the annular lateral end 26e in contact with the annular lateral surface 27g of the adjacent coupling body 27. When extremely great axial forces or tension is imparted to the hose H, the opposite turning forces on the coupling bodies 26 and 27 can be so great that a slight amount of turning movement is permitted even though the threads 26d and 27b are turned in a direction to tighten same, and such amount of turning is sufficient to loosen or relax the helix angle in both of the layers of wires 19 and 20. The modifications illustrated in FIGURES 5 and 6 of this invention may be used in such cases, as will be more fully explained hereinafter, to prevent such relaxing or loosening of the wires 19 and 20.

Upwardly extending end portions 19a of the wires 19 are confined between the end surface 35d and the end surface 27c prior to the swaging of the ring 35 by bending the end portions 19a upwardly behind the ring 35 and then threading the section 27 into position on the section 26. It will be evident that not only are the end portions 19a of the wires 19 confined between the end surfaces 35d and 27c, but the ring 35 is prevented from moving to the right (as viewed in FIGURE 1) during assembly and after swaging and furthermore, the hooking of the end portions 19a behind the ring 35 tends to pull the compression ring tighter when the wires 19 are placed under tension or pull. The end 27c of the body section 27 also has a relatively sharp annular projection or serration 27d which is forced into the ends 19a of the wires 19 to further assist in holding the wires 19 on the coupling C and to further assist in pulling the compression ring 35 tighter when the wires 19 are under tension or pull.

The body section 27 is formed in a manner similar to that of the body section 26; in that connection, it has an inclined or tapered surface 27e which slopes downwardly and inwardly with respect to the vertical or longitudinal axis of the hose H and the coupling C, and the wires 20 extend along such inclined or tapered surface 27e, with a layer of zinc or other embedding material 40 being disposed on the surface 27e. A second coupling ring or compression ring 41, which is identical with the ring 35, is positioned on the body section 27 and is mounted thereon and swaged in position in the same manner as previously explained in connection with the ring 35. The ends 20a of the wires 20 are confined between the end 41a of the ring 41 and the lateral end 28a of the male connector 28. A pointed projection or serration 28d is formed around the surface 28a so as to engage all of the ends 20a to further increase their gripping connection on the coupling C, in the same manner as explained above in connection with the wires 19.

The male connector 28 is formed with internal threads 28d which are in threaded engagement with the external threads 27f of the body section 27, and such connector 28 is threaded into position on the body section 27 after the coupling ring 41 has been swaged into its connected position (FIGURE 1). The external threads 28c of the male connector 28 are adapted to be threaded into engagement with a female connector (not shown) which is provided at the other end of the section of hose H and which would be identical with the male connector 28 except that the threads would be provided internally.

In carrying out the method of this invention for forming the coupling with the hose H, the conductor 10, wire braid layers 12 and 14, and the resilient layer 17 are assembled and the projecting ends of the layers 10, 12 and 14 are positioned over the buttress teeth 25b formed on the external surface of the nipple 25. Thereafter, the clamping ring 32 is positioned around the external surface of the wire braid layer 14. When the ring 32 is a solid ring, the inner extent of the annular projection 32b is outwardly of the outward extent of each of the ribs or annular projections 25e on the nipple 25. With the ring 32 in position so that the inwardly extending projection 32b is aligned with the groove 25c between the outwardly extending ribs 25e, a swaging apparatus is used for swaging or inwardly compressing the clamping ring 32 so as to cause the teeth 25b and 32a to bite into or penetrate the layers 10 and 14, respectively. The coil spring 15, with the fibrous cord 16, are then positioned over the resilient layer 17 and the outer surface of the clamping ring 32. Thereafter, the body section 26 is threaded into position on the nipple 25 and the layer of wires 19 is applied around the coil spring 15. If desired, a layer of tape 18 can be interposed between the coil 15 and the wires 19 (FIGURE 1). The ends of the wires 19 project over the inclined or tapered surface 26c of the body section 26. In order to hold such wires 19 on the surface 26c prior to the time that the compression ring 35 is fully swaged, the inclined surface 35a is pressed longitudinally or axially into contact with the wires 19 so as to squeeze them between such surface 35a and the surface 26c. With such arrangement, the wires 19 are prevented from overlapping during the swaging operation. If the rear bore portion 35b of the compression ring 35 were also tapered with the same taper as 35a during such initial positioning of the ring 35 on the body section 26, the wires 19 would tend to cross over each other as the ring is positioned on the inclined surface 26c. Such bending would occur because the wires 19 will not readily bend down past a critical diameter without crossing over each other. Such critical diameter occurs at about the point at which the wires 19 would form a cylinder when straightened out from most of their helix angle. In other words, the diameter of the bore portion 35b is such that it does not bend the wires 19 down beyond the point at which the wires cross over each other during the seating of the inclined portion 35a in contact with such wires 19. Stated differently, the intersection of the inclined or tapered portion 35a with the bore portion 35b is such that the wires 19 are not bent downwardly by the ring 35 beyond their critical diameter which was defined above.

After the ring 35 has been positioned with the inner tapered portion 35a in contact with the wires 19 so as to hold same, the end portions 19a of the wires 19 are bent upwardly behind the ring 35. The body section 27 is then threaded onto the body section 26 by tightening the left-hand threads 26d and 27b as tightly as possible to bring the surfaces 27g and 26e into contact. Thereafter the ring 35 is swaged or compressed inwardly so as to deform the ring 35 from its original shape (FIGURE 2) to its final shape (FIGURES 1 and 3) wherein the entire bore or inner surface of the ring 35 is at substantially the same angle as the portion 35a thereof was prior to such swaging operation. Also, the surface 35c which is initially formed at an angle extending outwardly and upwardly is moved downwardly so as to be substantially parallel to the longitudinal axis of the hose H and coupling C. As previously mentioned, the swaging operation also causes the embedding of the wires 19 into the metal or other material of the compression ring 35 by a "flowing" of the metal of the ring 35 to conform same to the surfaces of the wires 19 in contact therewith. Also, the wires 19 are embedded into the layer of zinc or other hardenable, non-fracturing material 36 which is disposed on the inclined or tapered surface 26c. The layer of zinc or other material 36 is preferably sprayed on the surface 26c in a molten or softened condition prior to the time that ring 35 is positioned on the body section 26 so that such material 36 adheres to and forms a part of the outer surface of the inclined or tapered portion 26c. The zinc or other material 36 is permitted to cool and harden and it is preferably machined to provide a smooth external surface on the material 36 prior to laying the wires 19 thereon. As the wires 19 are embedded in the layer 36 the material 36 is forced into the interstices between the wires 19 so that the wires 19 are locked to the material 36 and therefore are prevented from turning relative to the body section 26 upon the application of a turning or torque force to such wire 19, whereby the torque force on the ring 35 is reduced to thereby prevent its rotation relative to the section 26.

Since the end portions 19a are clamped between the outer surface 35d and the inner back-up surface 27c during such swaging of the ring 35, the wires 19 are securely held in a connected position on the body section 26. If an end or axial pull is exerted on the wires 19 to the left (FIGURE 1), any tendency of the wires 19 to move tends to move the ring 35 therewith and, of course, the movement of the ring 35 upwardly or to the left relative to the body section 26 effects an increased squeezing or gripping of the wires against the surface 26c or 36. Also, since the wires 19 are in contact with the entire inner surface 35a, any end pull on the wires 19 is evenly distributed over a relatively large area of the ring 35 to minimize the likelihood of shearing the wires 19 as they are pulled longitudinally.

The wires 20 are then applied over the wires 19 and, if desired, a layer of tape 21 can be positioned between the wires 20 and the wires 19. The wires 20 are connected to the body section 27 in the same manner as the wires 19 were connected to the body section 26. The compression ring 41 is initially used to hold the wires 20 in position on the inclined surface 27e so as to prevent crossing over of the wires 20 and thereafter the ring 41 is swaged into its deformed position (FIGURE 1) as described above in connection with the ring 35.

The ends 20a of the wires 20 are clamped or locked between the ends of surface 41a and the back-up surface 28a of the male connector 28 which is threaded onto the threads 27f of the second body section 27 prior to the swaging of the ring 41.

As previously pointed out, during the use of the hose H of this invention, it is normally suspended substantially vertically in a well bore and a large axial load or force is imparted to the hose H. Such weight or load is caused by the drilling equipment such as the drill bit, drilling power source or motor, drill collars and other sections of the hose H which are below the particular hose section H with which we are concerned. In any event, during the use of the hose H, particularly for drilling operations, the axial force imparted to the hose H causes the wires 19 and 20 to be pulled axially with an end pull which tends to straighten such wires from their helical wrap. As explained above, the tendency to straighten the wires 19 and 20 by such axial load imparts a torque or turning force to such wires 19 and 20 which in turn is imparted to the coupling bodies or members 26 and 27, respectively. Since the wires 19 and 20 are wrapped in opposite directions, the torque forces acting on the members 26 and 27 are in an opposite direction so that they tend to turn relative to each other if there is a sufficient torque or turning force imparted thereto from the wires 19 and 20. The threads 26d and 27b are purposely made left-hand threads when the wires 19 and 20 are wrapped as shown in FIGURE 1 so that the turning or torque forces imparted to the members 26 and 27 tends to tighten the threaded connection afforded by the threads 26d and 27b. However, despite the fact that the threads 26d and 27b are tightened as much as possible during the assembly so as to bring the lateral end surfaces 27g and 26e into contact, there is sufficient load or torque imparted to the wires 19 and 20 to still further cause the threads 26d and 27b to tighten further to a certain extent which is sufficient to sometimes relax or loosen the wires 19 and 20. If the loads are sufficiently light, such will not occur, but the forms of the invention shown in FIGURES 5 and 6 can be utilized to overcome such torque load, as will be more fully explained hereinafter.

In FIGURE 4 a modified construction of the hose H and the coupling C are illustrated. In FIGURE 4 the hose or support is designated by the letter H' and the coupling is designated by the letter C'. The parts of the hose H and coupling C which are the same as the parts of the hose H' and coupling C' are designated by the same numerals. The form illustrated in FIGURE 4 merely adds to the form of the invention FIGURE 1, an outer layer of wires 50 with fibrous twine or other similar fibrous material 51 therebetween. Also, the coupling C' is modified so as to connect the outer additional layer of wires 50 thereto.

The male connector 128 is modified as compared to the connector 28 of FIGURE 1 so that it is capable of being used for supporting the wires 50 and the cords 51 therebetween. The connector 128 has an inclined or tapered surface 128a which corresponds with the tapered surfaces 26c and 27e of the first and second body sections 26 and 27 of FIGURES 1 and 4. The compression ring 55 which clamps the ends of the wires 50 on the inclined surface 128a of the connector 128 is initially formed in substantially the same shape as the ring 35 illustrated in FIGURE 2, but is swaged into the shape illustrated in FIGURE 4 in the same manner as previously described in connection with the swaging of the coupling ring 35. Thus, the wires 50 and the cords 51 therebetween are ultimately embedded between the inner inclined or tapered surface 55a of the ring 55 and the layer of zinc or other hardenable, non-fracturing material 58. The ends 50a of the wires 50 are confined between the lateral outer surface 55b of the ring 55 and the lateral inner end surface 60a of the retaining ring 60. Such retaining ring 60 is preferably swaged into the final position (FIGURE 4) while the ring 55 is swaged into its final position. It will be noted that the connector 128 has an annular groove 128b into which an inwardly extending annular projection 60b is pressed during the swaging operation so that such ring 60 cannot move with respect to the connector 128 when it is swaged into the clamping position for the wires 50. The threads 26d and 27b are again left-hand threads in the form of the invention shown in FIGURE 4 and are originally made up tightly so that the surfaces 27g and 26e are in contact. Since the wires 50 and the wires 20 are wrapped in the same helical direction, even though at a different angle, the axial or end load on the hose H' does not cause a relative rotational movement between the coupling member 27 and the member 128 so that the threads 28b and 27f can be right-hand threads if desired. Except for the above mentioned differences, the hose or support H' and the coupling C' are identical with that hose H and coupling C illustrated in FIGURES 1–3.

The method of assembling or manufacturing the hose H' and coupling C' is identical with that described above in connection with the hose H and coupling C except that the connector 128 is mounted on the body section 27 instead of the connector 28 of FIGURE 1 and thereafter the layer of wires 50 is added and the rings 55 and 60 are swaged into position for clamping such wires 50 on the connector 128. The assembly of rings 55 and 60 on the body section 128 includes the initial positioning of the ring 55 over the wires 50 in the same manner as described above in connection with ring 35 and wires 19. Then the ends 50a of the wires are bent upwardly behind the ring 55. Thereafter the ring 60 is moved into position with its inner projection 60b over the groove 128b. The ring 60 is then swaged first, and subsequently the ring 55 is swaged to its final seated position (FIGURE 4).

In FIGURE 5 of the drawings, a modification of the hose construction and end coupling therefor of FIGURE 1 is illustrated, wherein additional means are provided for preventing the relaxing or loosening of the wires 19 and 20 when an axial or end pull is applied to the hose H. Such means includes an additional layer of zinc or other hardenable, non-fracturable material 136 which is a continuation of the layer of material 36 so as to extend same into the laterally extending annular area between the annular lateral surface 27c of the coupling member 27 and the laterally extending ends 19a of the wires 19. The layer of material 36 is preferably applied in the same manner as described above in connection with the form of the invention shown in FIGURE 1 of the drawings. As explained in connection with FIGURE 1, the material 36 is preferably sprayed in a molten or softened state to form a layer on the tapered surface 26c of the coupling member or body 26. After such layer 36 hardens or cools to a hardened state, it is ordinarily machined to provide a smooth external surface so that it is then ready to receive the wires 19 thereon. The layer of material 136 is applied to the end 27c of the coupling member or body 27 prior to the time that the member 27 is threaded or otherwise assembled on the coupling member 26. Such coating or layer of material 136 can be applied to the annular lateral surface 27c in numerous ways, as will be evident to those skilled in the art, but preferably, the coating 136 is zinc or other metallic material which is sprayed on in a molten or softened condition so as to form the layer 136 thereon. After the layer 136 hardens or cools to a hardened condition, it is then machined to provide a smooth external surface and to provide the desired tolerances for proper fitting of the wires 19 in contact therewith. The coupling member 27 with its coating layer 136 formed on the annular end 27c is threaded into position on the coupling member 26 after the ring member 35 has been initially positioned on the wires 19 and after the wires 19 have been bent laterally at their ends 19a, so that the layer 136 contacts the wires 19 at their ends 19a. Also, the subsequent swaging of the ring 35 forces the wires 19 and their ends into the layers 36 and 136, respectively. The amount of pressure involved is sufficient to ordinarily cause a fusion or "flowing" of the metal or other material of the layers 36 and 136 so that they in effect merge together as illustrated in FIGURE 5 of the drawings at their intersection. It will be appreciated that such "flowing" is a cold flow of the metal of the layers 36 and 136 which is the same as occurs in connection with the material layer 36 of FIGURES 1 and 4. The material of the layers 36 and 136 flows into the interstices between the wires 19 as previously described in connection with FIGURE 1.

The layer 36 prevents the wires 19 from turning relative to the ring member 35 and, of course, the material of the layer 36 is soft as compared to the relatively hard material of the coupling member or body 26 so that the wires 19 actually are embedded into the layer 36 as the ring 35 is swaged into its final position shown in FIGURE 5. Also, there is an embedding of the wires 19 into the internal surface of the coupling ring 35 to some extent as also indicated in FIGURE 5. Furthermore, as the coupling ring 35 is swaged so as to reduce its diameter to provide the substantially uniform external diameter on the ring 35 as shown in FIGURE 5, there is a displacement of the ring 35 in contact with the ends 19a of the wires 19 which forces the ends 19a of the wires 19 into contact with the layer 136 on the annular surface 27c. The force of the swaging is sufficient to actually embed the ends 19a into the layer 136 in the same manner as previously discussed in connection with the embedding of the wires 19 into the layer 36. The portion of the metal or other material of the layer 136 which is caused to "flow" into the interstices between the ends 19a in effect locks the wires 19 to the coupling member 27. Therefore, when an axial or end pull is applied to the hose H which tends to straighten the wires 19 and 20 from their helical wraps, the tendency of the wires 19 to move in an opposite direction to the wires 20 and therefore the tendency for the wires 19 and 20 to move the coupling members 26 and 27, respectively, in opposite directions to further tighten the threads 26d and 27b is overcome by the resistance provided at the layer 136. Such resistance is provided at the layer 136 because the wires 19 are actually connected to both the coupling members 26 and 27 through the layers 36 and 136, respectively. Therefore, as the coupling member 27 attempts to move relative to the coupling member 26, there would be a tendency to also move the wires 19 with the coupling member 27 due to the interlocking of the layer 136 with the ends 19a and such tendency to move the ends 19a of the wires overcomes the tendency of the wires 19 to turn or partially rotate the coupling member 26 relative to the coupling member 27. Therefore, relative rotational movement between the coupling members 26 and 27 is prevented by means of the interlocking action of the layer 136 with the ends 19a of the wires 19. It will be understood, of course, that the interlocking of the ends 19a of the wires 19 with the layer 136 connects the ends 19a to the coupling member 27 because the layer 136 is actually adhered or bonded to the member 27 at the surface 27c during its initial application.

Except for the differences enumerated above in connection with FIGURE 5, the remainder of the hose construction H of FIGURE 5 is identical with that illustrated in FIGURE 1 and the same numerals are used to indicate like parts.

FIGURE 6 illustrates still another modification of the form of the invention illustrated in FIGURE 1. FIGURES 7 and 8 are also partial sectional views which illustrate further the details of the modified construction of FIGURE 6. In such modified construction of FIGURES 6-8, an annular locking ring 236 is utilized for preventing relative rotation between the coupling members 26 and 27 when an axial or end pull is applied to the hose H, whereby a relaxing or loosening of the wires 19 and 20 is prevented. The lateral end surface 127c of the coupling member 27 corresponds with the lateral end surface 27c illustrated in FIGURES 1–5, except that it is serrated (FIGURE 7) for interfitting with corresponding serrations 236a on the locking ring 236, whereby the locking ring 236 is prevented from rotating relative to the coupling member 27. The opposite lateral annular face 236b of the locking ring 236 is preferably smooth for engagement with the wires 19 at their ends 19a (FIGURES 6 and 7). The locking ring 236 is also locked to the coupling member or body 26 by the inter-engagement or interlocking of the serrations 236c (FIGURES 6 and 8) with interfitting serrations 126 disposed annularly on the coupling member 26. The inter-engagement of the serrations 236c and 126 prevent the relative rotation between the coupling member 26 and the locking ring 236. Therefore, since the locking ring 236 is locked to both the coupling members 26 and 27, there is no relative rotation between the coupling members 26 and 27 and therefore it is impossible for additional tightening of the threads 26d and 27b to take place even through an extreme axial or end pull is applied to the hose H.

In the assembly of the form of the invention shown in FIGURE 6 and also in FIGURES 7 and 8, the wires 19 are initially positioned on the coupling member 26 for contact with the layer of material 36 on the tapered surface 26c. The layer of wires 20 is of course not present at that time and the ends 19a have not been bent laterally at that time. The ring 35 is moved longitudinally into position over the wires 19 and it is of course in the shape illustrated in FIGURE 2 of the drawings at that time. The wires 19 are then bent laterally at their ends 19a as shown in FIGURE 6 and the locking ring 236 is moved longitudinally into position behind the ends 19a to back up such ends 19a of the wires 19. Preferably, the ring 236 is oversize, that is, it has a larger internal diameter than the external diameter of the member 26 at the serrations 126 so that it is necessary to subsequently swage the locking ring 236, as will be explained. The next coupling member 27 is then threaded into position on the threads 26d and 27b to bring the serrations 127c into contact with the serrations 236a and the tightening of the threads 26d and 27b occurs until the surfaces 27g and 26e are firmly in contact and it is extremely difficult to tighten the threads any further. Since the serrations 126 and 236c are not in contact at that time, the locking ring 236 is free to turn or rotate with the locking ring 27 during the final stages of the tightening of the threads 26d and 27b. Thereafter, the ring 35 and the locking ring 236 are swaged into their final positions as illustrated in FIGURE 6 so that the ring 35 assumes the same position as previously explained in connection with FIGURE 1 and FIGURE 3, and the locking ring 236 assumes its position as illustrated in FIGURE 6 with the serrations 236c and 126 in firm engagement with each other. Also, the locking ring 236 is firmly positioned tightly between the serrated end 127c of the member 27 and the ends 19a of the wires 19. The additional layer of wires 20 is assembled as explained previously in connection with FIGURES 1 and 4. Also, all of the parts which have not been specifically discussed above in connection with FIGURES 6–8 are the same as illustrated in FIGURE 1 and have like numerals.

It is believed evident from the foregoing description that this invention is not limited to the connection of any particular number of layers of wires to a coupling, since, by increasing the number of body sections, the number of wire layers which can be attached to the coupling can be multiplied endlessly as desired. It is also believed evident that each of the body sections and the ring associated therewith can be used for holding a plurality of layers under each of the compression rings rather than only the single layer of wires as illustrated in each instance in the drawings. Also, it should be pointed out that the locking means of FIGURES 5 and 6 can be used with any number of layers of wires if so desired.

Although the ring 35 is illustrated in FIGURE 2 as having the outer surface 35c thereof inclined upwardly and outwardly for the purpose of providing metal to deform downwardly so as to obtain a substantially parallel outer surface after the swaging operation, it will be evident that such taper 35c is not essential to this invention.

It should be noted that the particular construction of the present coupling provides for an increased gripping action on each layer of wires in the support or hose as an end pull or longitudinal force is exerted on the wires tending to move them away from the coupling. Also, a plurality of annular layers may be separately connected to the end coupling without increasing the external diameter of the hose at the coupling so that the size of the coupling does not offer any restriction to the movement of the hose in well bores or other openings of limited size.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An end coupling for a tubular conductor having a first tubular layer of wires therewith, including a first tubular body section, a first coupling ring surrounding said body section, the ends of said wires being confined between said body section and said coupling ring, coactive surfaces on said body section and said ring for swaging said ends of said wires therebetween so as to evenly distribute any pulling force on said wires to said surfaces, a second tubular layer of wires with said tubular conductor wrapped externally of said first layer of wires and over said first coupling ring, a second tubular body section threaded to said first tubular body section and forming a continuation thereof longitudinally, a second coupling ring surrounding said second body section with the ends of the wires confined therebetween, said first coupling ring having an external diameter substantially equal to the external diameter of said first tubular layer of wires, and said second coupling ring having an external diameter substantially equal to the external diameter of said second layer of wires.

2. The structure set forth in claim 1, wherein each of said layers of wires is helically wound and in opposite directions to each other.

3. The method of connecting to a coupling a plurality of wires which are disposed substantially parallel to each other, wherein the coupling includes a coupling body having a tapered external surface and a coupling ring which is initially provided with a portion of its inner surface which is tapered at substantially the same angle as said tapered external surface and with another portion of its inner surface which is substantiallly parallel to the longitudinal axis of the coupling, comprising the steps of, initially confining the ends of said wires between and in-contact with said tapered external surface of said body and the tapered inner portion of said ring to hold said wires substantially parallel to each other, and thereafter deforming said ring to urge the substantially parallel inner portion of the ring into substantial alignment with the tapered inner portion and in contact with the wires.

4. An end coupling for a hose having a layer of separate wires, comprising a tubular coupling body having a longitudinal opening therethrough and an external surface which is tapered downwardly and outwardly with respect to the end of the hose to which the coupling is attached, a layer of embedding material on said external surface which is softer than said internal surface and said wires, said layer of wires being laid more nearly parallel to the axis of the coupling body than perpendicular thereto and being embedded in said layer of embedding material on said external tapered surface, a swaged coupling ring surrounding said layer of wires in clamping engagement therewith to clamp said wires on said coupling body, the internal surface of said ring being also tapered substantially parallel to the tapered external surface of said coupling body so that any tendency for a movement of the layer of wires in a direction longitudinally towards the hose and away from the coupling imparts an upward movement to said coupling ring relative to said coupling body to increase the gripping action of said coupling ring on said wires, said coupling ring having substantially the same external diameter as the external diameter of said layer of wires whereby said end coupling is provided without increasing the external size of the hose, the ends of said wires being bent laterally, a retaining member connected to said coupling body outwardly of said coupling ring for confining the laterally extending ends of said wires between the retaining member and the outward end of said coupling ring to frictionally clamp said wires against longitudinal movement relative to said coupling, and a locking ring interposed between and in contact with said laterally extending ends of said wires and said retaining member, said locking ring having an interlocking connection with said retaining member and said coupling ring to lock the retaining member to said coupling ring for thereby preventing relative rotation therebetween, whereby loosening of a helical wrap of the wires is prevented upon the application of an axial force to the hose.

5. The method of connecting a layer of wires of a hose to a coupling wherein such coupling includes a coupling body section having an external downwardly and outwardly inclined surface, a coupling ring having an internal downwardly and outwardly inclined surface, and an annular back-up member having a back-up surface adapted to extend laterally with respect to the longitudinal axis of the coupling, comprising the steps of, positioning the wires of the hose around the external inclined surface of the coupling body section, placing the coupling ring around said wires with a portion of its internal inclined surface in contact therewith and with a portion thereof spaced away from and out of contact with said wires, connecting the annular back-up member to the coupling body section to position said back-up surface adjacent said external inclined surface for confining said coupling ring against substantial longitudinal movement on the coupling body section, and thereafter swaging said coupling ring while it is so confined to deform the ring to bring substantially the entire inner surface of said coupling ring into contact with the wires for clamping the wires on said coupling body section.

6. In combination with a hose having two layers of wires which are helically disposed in opposite helical directions, an end coupling including, a first coupling body having an external surface upon which the inner of said layers of wires are positioned, a first coupling ring around the inner layer of said wires for holding same on said external surface of said first coupling body, the ends of the inner layer of said wires being bent upwardly behind said coupling ring and in contact therewith, and a second coupling body connected to said first coupling body and having an annular surface thereof in contact with the ends of the inner layer of said wires whereby said ends are confined between said first coupling ring and said second coupling body, a second coupling ring for holding the outer layer of said wires on said second coupling body, and locking means for preventing a turning of said coupling bodies relative to each other when an axial pull is applied to said hose whereby a relaxing or loosening of said two layers of wires is prevented.

7. The structure set forth in claim 6, wherein said locking means includes a locking ring in locking engagement with said coupling bodies to lock same against turning relative to each other.

8. The structure set forth in claim 6, wherein said locking means includes a hardened embedding material between said annular surface of said second coupling body and said ends of said inner layer of wires, said embedding material being bonded to said annular surface and embedded in the interstices between said ends of said inner layer of wires.

9. The method of connecting a layer of wires of a hose to a coupling wherein such coupling includes a coupling body section having an external inclined surface, a coupling ring having an internal inclined surface, and an annular retaining means, comprising the steps of, initially positioning the wires around the external inclined surface of the coupling body section, placing the coupling ring around said wires with a portion of its internal inclined surface in contact therewith, bending the ends of the wires upwardly behind the coupling ring, connecting the retaining means to the coupling body section, and thereafter swaging the coupling ring to clamp the wires between the coupling ring and the coupling body section and to also clamp the ends of the wires between the coupling ring and the retaining means.

10. An end coupling for a tubular conductor having a first tubular layer of wires therewith, including a first tubular body section, a first coupling ring surrounding said body section, the ends of said wires extending between said body section and said coupling ring, coactive surfaces on said body section and said ring which are inclined downwardly and outwardly away from the tubular conductor for retaining said wires therebetween so as to evenly distribute any pulling force on said wires to said surfaces, a second tubular layer of wires with said tubular conductor wrapped externally of said first layer of wires and over said first coupling ring, a second tubular body section connected to said first tubular body section, a second coupling ring surrounding said second body section with the ends of the second layer of wires extending therebetween, coactive surfaces on said second body section and said second coupling ring which are inclined downwardly and outwardly away from the tubular conductor for retaining said ends of said second layer of wires therebetween so as to evenly distribute any pulling force on said second layer of wires to said surfaces on said second body section and said second coupling ring, said first coupling ring having an external diameter substantially equal to the external diameter of said first tubular layer of wires, and said second coupling ring having an external diameter substantially equal to the external diameter of said second layer of wires.

11. The method of connecting a plurality of separate wires of a tubular conductor to a coupling body wherein the coupling body has an annular external surface tapered downwardly and outwardly away from the tubular conductor, comprising the steps of, forming a coupling ring with a first inner annular tapered surface which is at substantially the same angle of taper as the annular external tapered surface of the coupling body, also forming the coupling ring with a second inner annular surface which extends at a lesser downward angle than said first inner annular tapered surface, positioning the ends of said wires substantially parallel to each other around the body of the coupling, placing the coupling ring around said wires so that only the first inner surface of said ring is in contact with the wires to initially hold the wires substantially parallel to each other on the body with the ends of such wires positioned inwardly of said coupling ring, and thereafter compressing said coupling ring inwardly to force the second inner surface of the ring inwardly to substantially the same taper as the first inner surface of said ring and into contact with the wires to thereby clamp the wires between the coupling and the ring.

References Cited in the file of this patent

UNITED STATES PATENTS

| | | |
|---|---|---|
| 992,426 | James | May 16, 1911 |
| 1,678,640 | Hall | July 31, 1928 |
| 2,150,471 | Van Vulpen | Mar. 14, 1939 |
| 2,220,785 | Goodall | Nov. 5, 1940 |
| 2,237,490 | Knowland | Apr. 8, 1941 |
| 2,753,196 | Melson | July 3, 1956 |
| 2,809,056 | Kaiser | Oct. 8, 1957 |